(12) United States Patent
Kim et al.

(10) Patent No.: US 8,610,838 B2
(45) Date of Patent: Dec. 17, 2013

(54) DISPLAY DEVICE HAVING PARTICULAR BARRIER PORTION

(75) Inventors: Beom-Shik Kim, Yongin (KR); Hui Nam, Yongin (KR); Jun-Il Kwon, Yongin (KR)

(73) Assignee: Samsung Display Co., Ltd. (KR)

( * ) Notice: Subject to any disclaimer, the term of this patent is extended or adjusted under 35 U.S.C. 154(b) by 142 days.

(21) Appl. No.: 13/415,714

(22) Filed: Mar. 8, 2012

(65) Prior Publication Data

US 2013/0127831 A1 May 23, 2013

(30) Foreign Application Priority Data

Nov. 18, 2011 (KR) .......................... 10-2011-0120911

(51) Int. Cl.
| | |
|---|---|
| *G02F 1/1335* | (2006.01) |
| *G02F 1/1343* | (2006.01) |
| *G02F 1/1337* | (2006.01) |
| *G06T 15/00* | (2011.01) |
| *G09G 3/36* | (2006.01) |

(52) U.S. Cl.
USPC .............. 349/15; 349/139; 349/130; 349/95; 349/96; 345/419; 345/87

(58) Field of Classification Search
USPC ........... 349/15, 139, 130, 95, 96; 345/419, 87
See application file for complete search history.

(56) References Cited

U.S. PATENT DOCUMENTS

| | | | |
|---|---|---|---|
| 7,483,209 B2 * | 1/2009 | Nam et al. ................... 359/464 |
| 2007/0046777 A1* | 3/2007 | Song et al. ..................... 348/56 |

FOREIGN PATENT DOCUMENTS

| | | |
|---|---|---|
| JP | 03-119889 A | 5/1991 |
| KR | 10-2002-0041382 A | 6/2002 |
| KR | 10-2008-0104715 A | 12/2008 |
| KR | 10-2010-0013179 A | 2/2010 |
| KR | 10-2010-0084373 A | 7/2010 |
| KR | 10-2011-0077708 A | 7/2011 |

* cited by examiner

*Primary Examiner* — Mike Qi
(74) *Attorney, Agent, or Firm* — Knobbe Martens Olson & Bear, LLP (57) ABSTRACT

An electronic image device includes a display unit that displays an image; and a barrier portion disposed over the display unit and configured to control transmission of the image to a user. The barrier portion includes a first substrate and a second substrate opposing each other to define a space in which interception portions and lens portions are to be alternately disposed. The barrier portion further includes a common electrode disposed over one surface of the second substrate facing the first substrate; a liquid crystal layer disposed between the first substrate and the second substrate, a first electrode disposed at a region corresponding to each of the interception portions, and a second electrode including a plurality of sub-electrodes and disposed at a region corresponding to each of the lens portions.

12 Claims, 8 Drawing Sheets

Common electrode

Second electrodes

First electrodes

DISPLAY DEVICE HAVING PARTICULAR BARRIER PORTION

RELATED APPLICATIONS

This application claims priority to and the benefit of Korean Patent Application No. 10-2011-0120911 filed in the Korean Intellectual Property Office on Nov. 18, 2011, the entire contents of which are incorporated herein by reference.

BACKGROUND

1. Field

The described technology relates generally to an electronic image device that can display a three-dimensional (3D) image.

2. Description of the Related Art

Nowadays, a 3D image display device is applied to various fields such as medical treatment, computer game, advertisement, education, and military. As a method of displaying a 3D image, a holography or stereoscopy method has been widely researched.

The stereoscopy method provides a 3D image to a person by separating and displaying two 2D images having binocular disparity toward a user's left eye and right eye, respectively. In the stereoscopy method, a glass method uses polarized light and a shutter. In an autostereoscopy method, an image is divided into plural portions and each eye can see different portions of the image.

The autostereoscopy method includes a parallax barrier method and a lenticular lens method. The parallax barrier method includes generating disparity in eyes by placing a barrier having slits in front of a display device. The display device divides an image into plural portions to be viewed through the slits. The left and right eyes can see different portions of the image transmitted through slits.

However, when displaying a 3D image, portions of an image reach the eyes of a user by passing through a slits. Accordingly, when each of the slits is excessively wide, portions of the image for the left eye and portions of the image for the right eye can be mixed. In order to avoid this, the width of each slit can be reduced. However, the slit configuration with a reduced width may provide a 3D image having a deteriorated luminance.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide an electronic image device having advantages of obtaining a 3D image having improved luminance while reducing generation of crosstalk in an electronic image device that selectively displays a 2D image and a 3D image.

An embodiment provides an electronic image device including: a display unit configured to displays an image; and a barrier portion that is positioned over the display unit and configured to control transmission of the image to a user. The barrier portion includes a first substrate and a second substrate opposing each other to define a space in which interception portions and lens portions that are to be alternately formed; a common electrode disposed over one surface of the second substrate facing the first substrate; and a liquid crystal layer that is disposed between the first substrate and the second substrate. A first electrode is disposed at a region corresponding to each of the interception portions, and a second electrode including a plurality of sub-electrodes is disposed at a region corresponding to each of the lens portions.

The number of the sub-electrodes of the second electrode may be three or more, and the electronic image device is configured to apply voltage to each sub-electrode such that the value of the voltage applied to a first one of the sub-electrodes is smaller than that of the voltage applied a second sub-electrode when a distance between the first sub-electrode and a central portion of the lens portion is smaller than that between the second sub-electrode and the central portion of the lens portion.

The first electrode may be formed in a single piece.

The first electrode and at least part of the sub-electrodes of the second electrode may be formed in a common imaginary plane disposed over the first substrate.

The electronic image device may further include at least one insulation layer that is provided over the first substrate. At least one of the plurality of sub-electrodes may be disposed between the insulation layer and the first substrate and separated from another sub-electrode by the insulation layer.

Each of the first electrode and the second electrode may be formed in a stripe shape.

The liquid crystal layer may include liquid crystals, and the liquid crystals positioned in the lens portion may be arranged in a lens form when voltage is applied.

The barrier portion may further include a first polarizing plate disposed over an outer surface of the first substrate; and a second polarizing plate disposed over an outer surface of the second substrate.

A polarization axis of the first polarizing plate and a polarization axis of the second polarizing plate may be generally perpendicular to each other.

The barrier portion may further include a first orientation film disposed between the first substrate and the liquid crystal layer; and a second orientation film disposed between the second substrate and the liquid crystal layer.

A rubbing direction of the first orientation film may be the same as a polarizing axis of the first polarizing plate, and a rubbing direction of the second orientation film may be the same as a polarizing axis of the second polarizing plate.

The barrier portion may be configured to allow light that is emitted from the display unit to be transmitted through the interception portions when voltage is not applied to the first and second electrodes. The barrier portion may be configured to intercept light that is emitted from the display unit at the interception portions when voltage is applied to the first and second electrodes.

According to embodiments of the present invention, in an electronic image device that selectively displays a 2D image and a 3D image, crosstalk can be suppressed from occurring. Thus, a 3D image having improved luminance can be obtained.

DETAILED DESCRIPTION

Embodiments of the present invention will be described more fully hereinafter with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, like reference numerals designate like elements in several embodiments and are representatively described in the first embodiment and elements different from those of the first embodiment will be described in other embodiments.

Further, in the drawings, a size and thickness of each element are randomly represented for better understanding and ease of description, and the present invention is not limited thereto.

In the drawings, the thickness of layers, films, panels, regions, etc., are exaggerated for clarity. In the drawings, for better understanding and ease of description, thicknesses of some layers and areas are excessively displayed. When it is said that any part, such as a layer, film, region, or plate, is positioned on another part, it means the part is directly on the other part or above the other part with at least one intermediate part.

In addition, unless explicitly described to the contrary, the word "comprise" and variations such as "comprises" or "comprising", will be understood to imply the inclusion of stated elements but not the exclusion of any other elements. Further, in the specification, it means that an upper part of a target portion indicates an upper part or a lower part of a target portion, and it does not mean that the target portion is always positioned at the upper side based on a gravity direction.

Hereinafter, an electronic image device 1000 according to a first embodiment will be described with reference to FIGS. 1 to 7.

Figure 1:
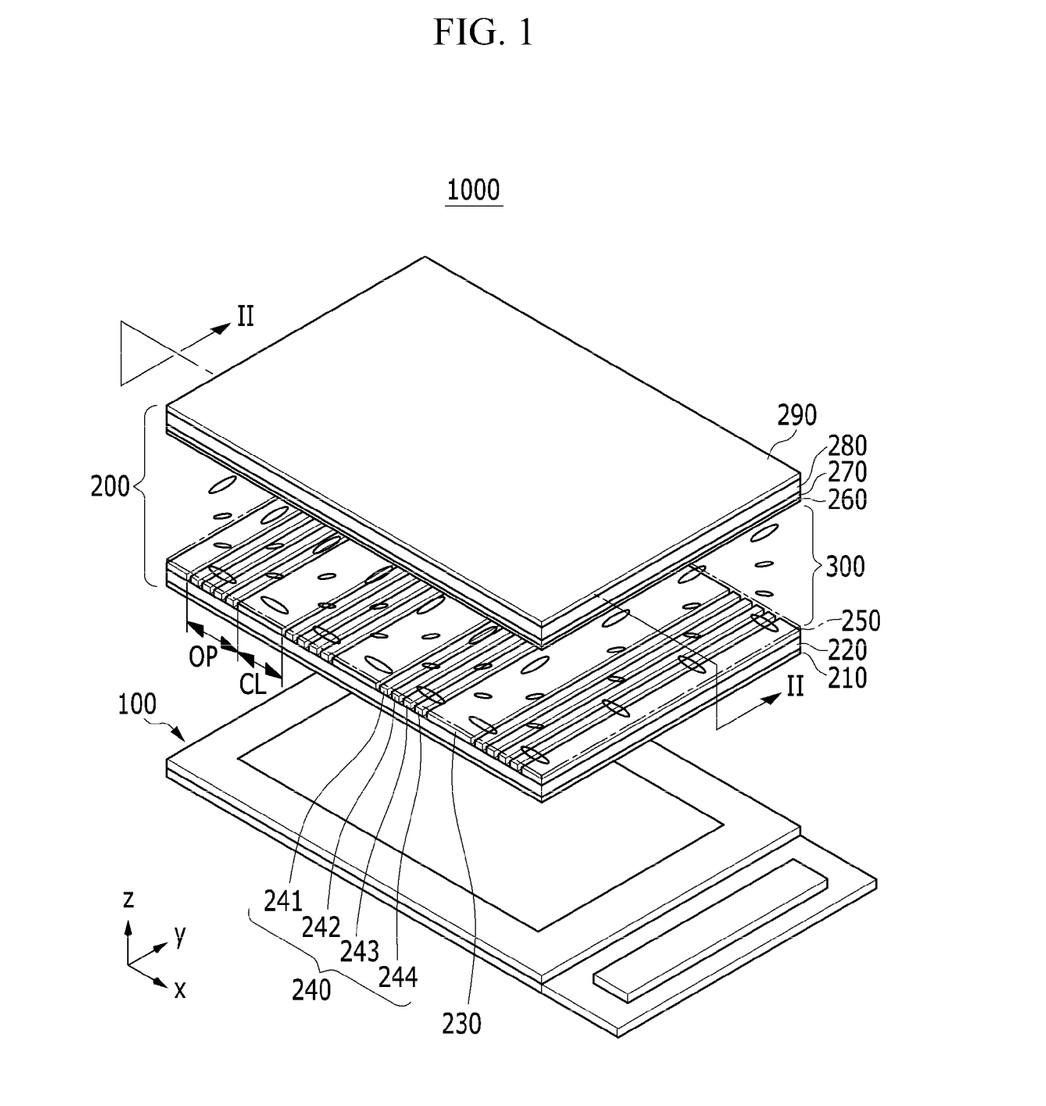
FIG. 1 is an exploded perspective view illustrating an electronic image device according to a first embodiment.

FIG. 1 is an exploded perspective view illustrating an electronic image device according to a first embodiment.

As shown in FIG. 1, in order to selectively display one of a 3D image and a 2D image, the electronic image device 1000 includes a display unit 100 and a barrier portion 200.

The display unit 100 displays an image and may be one selected among an organic light emitting diode display, a liquid crystal display device, and a plasma display panel (PDP).

In more detail, the display unit 100 selectively displays a left-eye image and a right-eye image as an image in order to provide a 3D image to a user, or an image for both eyes as an image in order to provide a 2D image to a user.

When the display unit 100 is a liquid crystal display device, the display unit 100 includes a display panel including both substrates and liquid crystal material that is positioned between both substrates and a backlight unit that radiates an image to a display panel. Here, the both substrates include a substrate body that is formed with glass, plastic, or metal, and further includes a metal pattern and color filter that are formed on the substrate body to be used as an electrode, and a vertical electric field is formed at a space between the both substrates and thus a liquid crystal layer performs a shutter function according to a vertical electric field, whereby the display unit 100 selectively displays a 2D image or a 3D image. Further, when the display unit 100 is an organic light emitting diode display, the display unit 100 includes both substrates and organic light emitting diodes that are positioned between both substrates. Here, the organic light emitting element is a self-luminant element, and an organic emission layer that is included in the organic light emitting element emits light, thereby selectively displaying a 2D image or a 3D image. Further, when the display unit 100 is a PDP, the display unit 100 includes both substrates that form a barrier rib and plasma that is positioned within the barrier rib. As plasma emits light, the display unit 100 selectively displays a 2D image or a 3D image.

Figure 2:
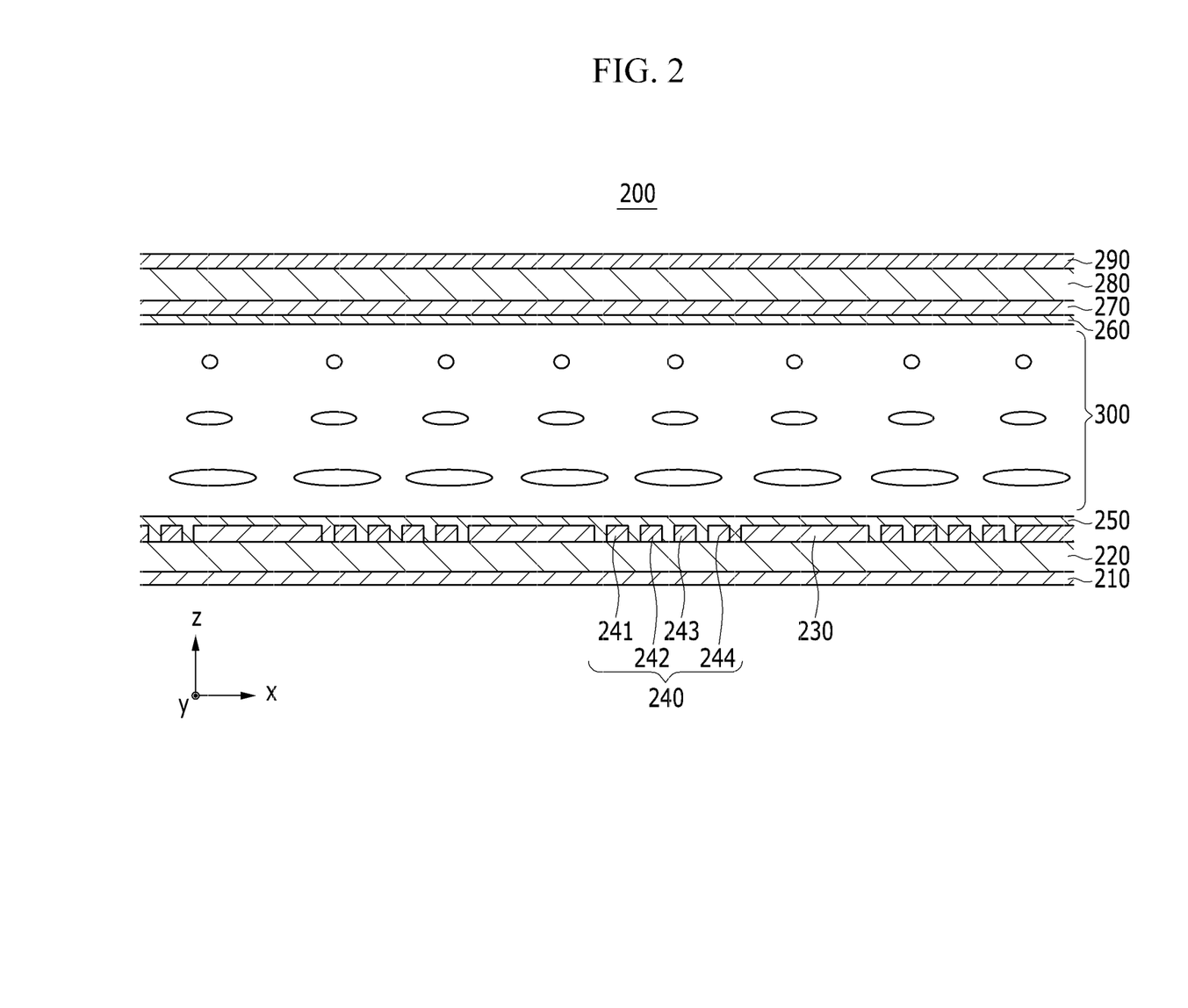
FIG. 2 is a cross-sectional view illustrating a barrier portion that is included in the electronic image device taken along line II-II of FIG. 1.

FIG. 2 is a cross-sectional view illustrating the barrier portion 200 taken along line II-II of FIG. 1.

As shown in FIGS. 1 and 2, the barrier portion 200 performs a function of optically converting an image so that an image that is displayed by the display unit 100 may be realized as a 3D image to a user. The barrier portion 200 includes a first substrate 220 and second substrate 280 that are arranged opposing each other with a predetermined distance. First electrodes 230 and second electrodes 240 that are formed on an inner surface of the first substrate 220. A common electrode 270 is formed on an inner surface of the second substrate 280, and a liquid crystal layer 300 is positioned at a space between the first substrate 220 and the second substrate 280.

In embodiments, the first substrate 220 is formed as a light-transmission substrate such as glass or plastic and may have flexibility. A plurality of interception portions or regions CL and lens portions or regions OP that are alternately formed to intercept or transmit light are formed between the first substrate 220 and the second substrate according to the application electric signal. The first electrode 230 is positioned at an area corresponding to the interception portion CL, and the second electrode 240 is positioned at an area corresponding to the lens portion OP.

The first electrode 230 is transparently formed by including a light-transmission conducting material such as indium tin oxide (ITO) or indium zinc oxide (IZO). The first electrode 230 is formed in a stripe shape having the long side in a vertical direction (y-axis direction in the drawing) of the display unit 100 (or a first substrate). The first electrode 230 is formed in plural on the first substrate 220 while being positioned parallel at a gap in a horizontal direction (x-axis direction in the drawing) of the display unit 100 (or a first substrate).

The second electrode 240 is transparently formed by including a light-transmission conducting material such as ITO or IZO. The second electrode 240 has at least three sub-electrodes, each having a width smaller than that of the first electrode 230, and the sub-electrodes are formed as one set and are formed between two immediately neighboring first electrodes 230. In order to prevent an electric short from occurring, the sub-electrodes of the second electrode 240 are positioned with separated by a predetermined width. For reference, in the present embodiment, four sub-electrodes 241, 242, 243, and 244 are formed as one set and form the second electrode 240.

The common electrode 270 is transparently formed by including a light-transmission conducting material such as ITO or IZO. The common electrode 270 is formed as one body in an entire area of the second substrate 280.

The second substrate 280 is formed as a light-transmission substrate such as glass or plastic, as in the first substrate 220 and may have flexibility.

The barrier portion 200 further includes a first orientation film 250 that is formed while covering the first electrodes 230 and the second electrodes 240, a second orientation film 260 that is formed on the common electrode 270, a first polarizing plate 210 that is attached to an outer surface of the first substrate 220, and a second polarizing plate 290 that is attached to an outer surface of the second substrate 280.

The first orientation film 250 and the second orientation film 260 perform a function of arranging liquid crystals constituting the liquid crystal layer 300 in a specific state. In the first embodiment, the first orientation film 250 is rubbed in a horizontal direction, i.e., an x-axis direction in the drawings of the display unit 100. The first orientation film 250 contacts with the liquid crystal layer 300, and in a state in which an electric field is not applied to the liquid crystal layer 300, the major axis of liquid crystals that are included in the liquid crystal layer 300 is arranged parallel to an x-axis direction by the first orientation film 250. The second orientation film 260 is formed in the second substrate 280 to cover the common electrode 270. The second orientation film 260 is rubbed in a direction, i.e., a y-axis direction in the drawing, generally perpendicular to a rubbing direction of the first orientation film 250. The second orientation film 260 contacts with the liquid crystal layer 300, and in a state in which an electric field is not applied to the liquid crystal layer 300, the major axis of liquid crystals that are included in the liquid crystal layer 300 is arranged parallel to a y-axis direction by the second orientation film 260. That is, as rubbing directions of the first orientation film 250 and the second orientation film 260 are orthogonally formed, when a voltage is not applied, liquid crystals form a structure of a twisted nematic (TN) mode that is arranged in a twist angle.

The liquid crystal layer 300 is positioned between the first orientation film 250 and the second orientation film 260. By voltage that is selectively applied to the first electrodes 230, the second electrodes 240, and the common electrode 270, a vertical electric field is formed in the liquid crystal layer 300, and thus liquid crystals are tilted, whereby the major axis of liquid crystals is rearranged. In this case, as the display unit 100 displays at least one of a left-eye image and a right-eye image as an image, the electronic image device 1000 displays a 3D image. Further, when a vertical electric field is not applied to the liquid crystal layer 300, the display unit 100 displays an image for both eyes as an image, and thus the electronic image device 1000 displays a 2D image. A rearrangement of liquid crystals and an image displayed in the display unit 100 depending on the formation of a vertical electric field in the liquid crystal layer 300 will be described later.

The first polarizing plate 210 and the second polarizing plate 290 are line polarizing plates and orthogonally dispose polarization axes. In the first embodiment, a polarization direction of the first polarizing plate 210 corresponds with a rubbing direction (x-axis direction in the drawing) of the first orientation film 250, and a polarization direction of the second polarizing plate 290 corresponds with a rubbing direction (y-axis direction in the drawing) of the second orientation film 260. However, a polarization direction is not limited thereto, and when polarization axes of the first polarizing plate 210 and the second polarizing plate 290 are orthogonal, a polarization direction of each polarizing plate may dispose orthogonal to a rubbing direction of each orientation film. In embodiment, by using such a structure, when a voltage is not applied, a mode of the liquid crystal layer 300 becomes a normally white (NW) mode in which light emitted from the display can be transmitted through the entire portions of the barrier portion.

The barrier portion 200 of the foregoing structure displays a 2D image or a 3D image by controlling the application of voltage to the first electrodes 230, the second electrodes 240, and the common electrode 270. Particularly, when displaying a 3D image, the barrier portion 200 enables to operate the liquid crystal layer 300 that is positioned on a lens portion OP as a liquid crystal lens by controlling the application of the voltage to the second electrodes 240.

Hereinafter, a process in which the electronic image device 1000 according to a first embodiment displays a 2D image and a 3D image will be described in detail.

In embodiment, in order to display a 2D image, the display unit 100 displays an image for both eyes. In this case, because an electric field is not formed in the barrier portion 200, the barrier portion 200 operates to be a transmission type in an entire area, as shown in FIG. 2. Thereby, an image for both eyes that is displayed by the display unit 100 is viewed by a user's both eyes via the barrier portion 200, whereby the user can recognize a 2D image from the electronic image device 100.

Next, it will be described that the electronic image device 1000 according to the first embodiment displays a 3D image with reference to FIGS. 3 and 4.

Figure 3:
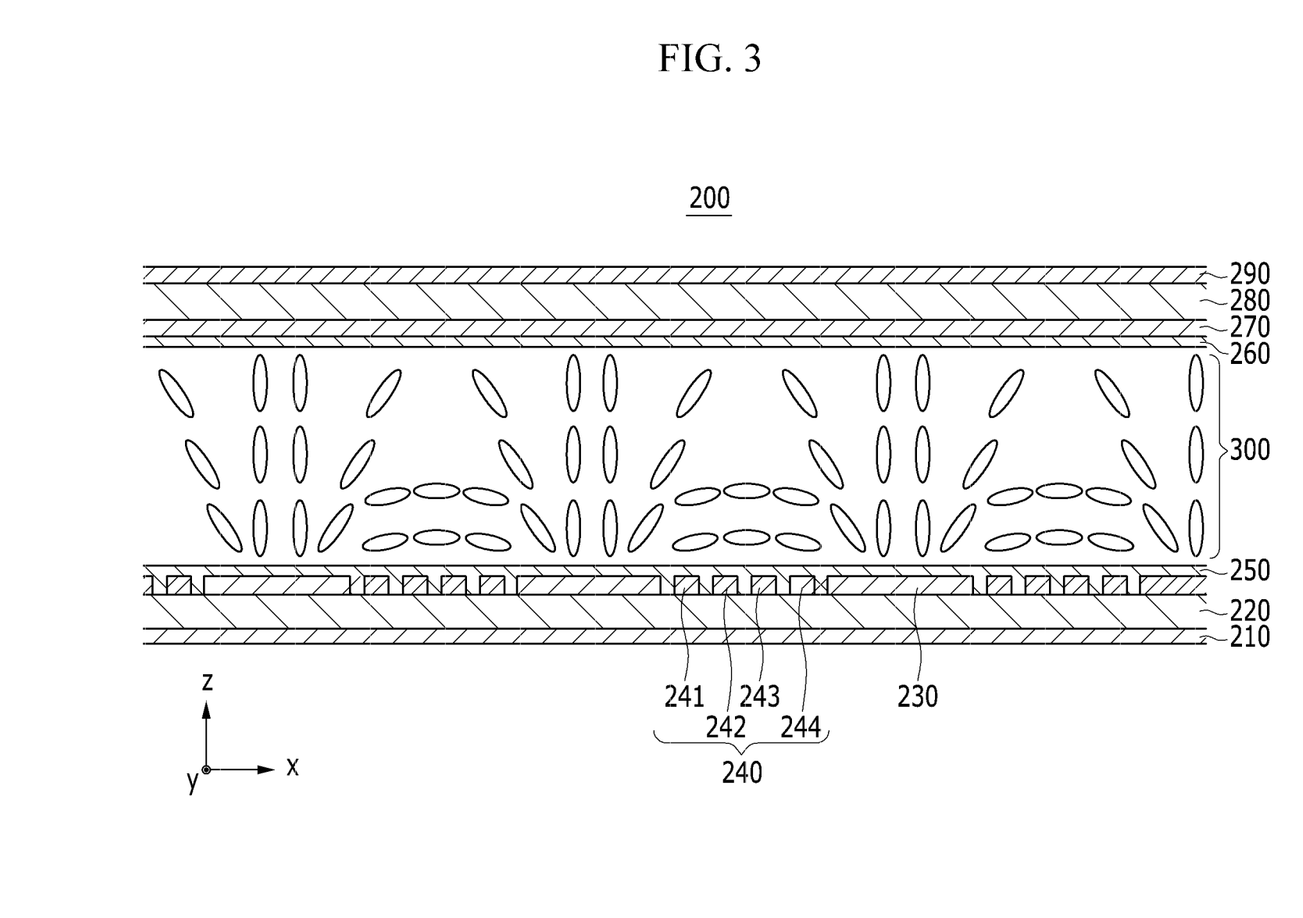
FIG. 3 is a cross-sectional view illustrating a state in which an electric field is formed in a liquid crystal layer in the barrier portion of FIG. 2.
Figure 4:
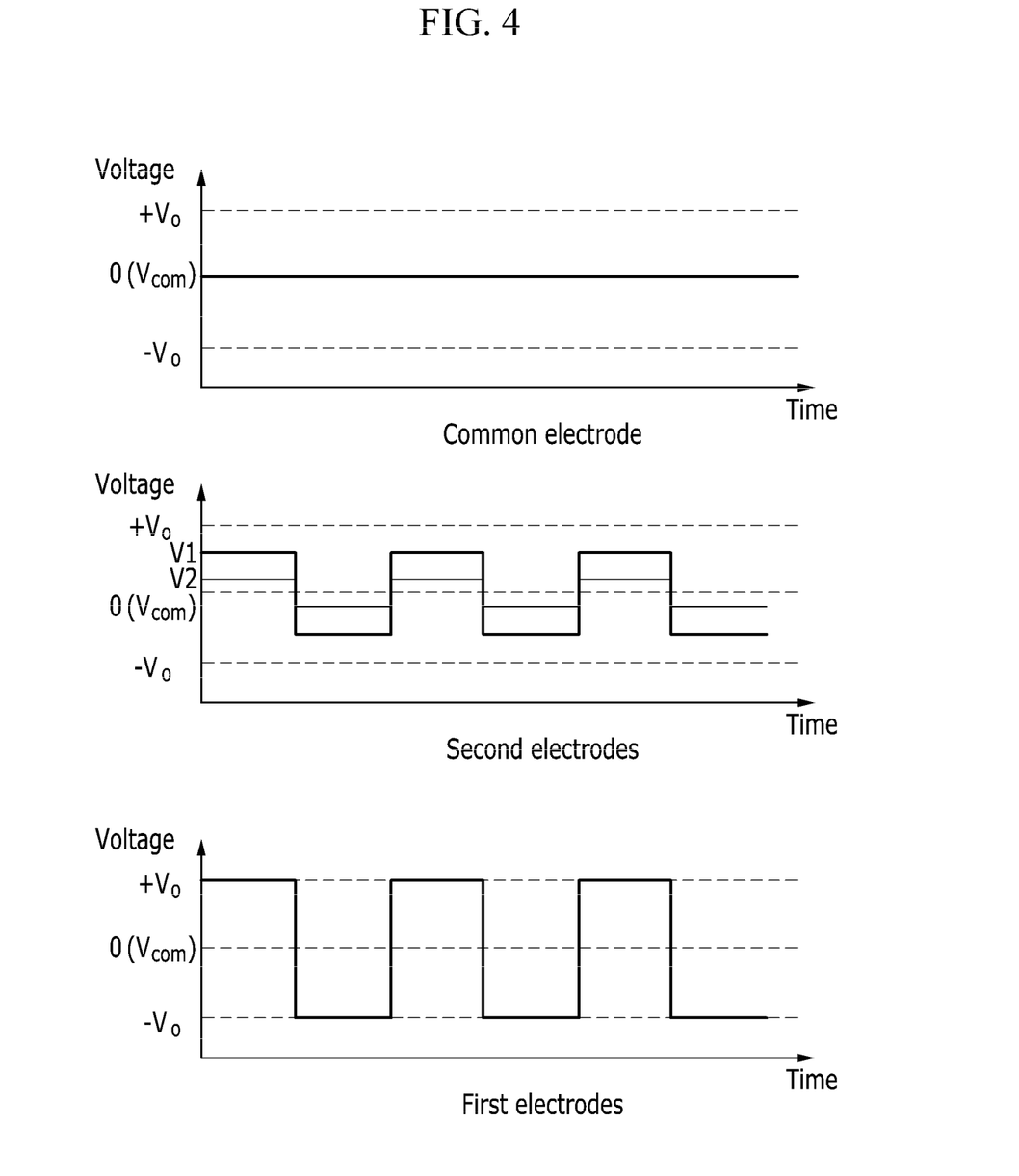
FIG. 4 is a graph illustrating a magnitude of a voltage that is applied to each electrode.

FIG. 3 is a cross-sectional view illustrating a state in which an electric field is formed in the liquid crystal layer 300 of the barrier portion 200 taken along line II-II of FIG. 1, and FIG. 4 is a graph illustrating a magnitude of a voltage that is applied to electrodes of the barrier portion 200.

Referring to FIGS. 3 and 4, a common voltage Vcom (for example, 0 (zero) V) is applied to the common electrode 270, and a voltage, i.e., a liquid crystal driving voltage $V_0$ is applied to the first electrodes 230. The voltage values Vcm and $V_0$ can be determined such that the voltage difference can rearrange liquid crystals. Accordingly, by the voltage difference between the common electrode 270 and the first electrodes 230, in an area, i.e., in an interception portion at which the first electrodes 230 are positioned, liquid crystals vertically align in a thickness direction (z-axis direction of the drawing) of the barrier portion 200. Therefore, while light that is linearly polarized in an x-axis direction by the first polarizing plate 210 passes through the liquid crystal layer 300, a polarization axis is sustained in the interception portion CL and thus light is intercepted instead of transmitting the second polarizing plate 290.

In embodiments, voltage is applied to the second electrodes 240 so that liquid crystals may be arranged in a lens form in an area, i.e., the lens portion OP at which the second electrodes 240 are positioned. In some embodiments of first to fourth sub-electrodes 241, 242, 243, and 244 that are included in the second electrodes 240 that are disposed at the lens portion OP, the smaller a distance between a sub-electrode and a central portion of the lens portion OP is, the smaller a magnitude of the voltage applied to the sub-electrode is. Thus liquid crystals are arranged in a convex lens form, as shown in FIG. 3. Particularly, in embodiments, the different voltages can be applied to at least two neighboring sub-electrodes among the first to fourth sub-electrodes 241, 242, 243, and 244. In some embodiments, where a distance between the center of the lens forming region OP and a first one (for example, sub-electrode 242) of two neighboring sub-electrodes is smaller than that between the central portion of the lens forming region OP and a second sub-electrode (for example, sub-electrode 241) of two neighboring sub-electrodes, the magnitude of the voltage applied to the first sub-electrode is smaller than that of the voltage applied to the second sub-electrode.

Specifically, a first voltage V1 larger than a common voltage Vcom and smaller than a liquid crystal driving voltage $V_0$ is applied to the first sub-electrode 241 and the fourth sub-electrode 244 of the second electrodes 240, and a second voltage V2 larger than a common voltage Vcom and smaller than the first voltage V1 is applied to the second sub-electrode 242 and the third sub-electrode 243 that are separately positioned between the first sub-electrode 241 and the fourth sub-electrode 244. In this way, a magnitude of a vertical electric field is changed by a differently applied voltage, and thus a degree in which liquid crystals are tilted is changed, whereby liquid crystals may be resultantly arranged in a convex lens form, as shown in the lens portion OP of FIG. 3. That is, in the lens portion, in order to arrange liquid crystals in a lens form, by differently applying to reduce a voltage that is applied to the second electrodes 240 as advancing to a central portion without adding a separate constituent element, liquid crystals may be efficiently arranged in a lens form. Further, in the first embodiment, the number of sub-electrodes 241, 242, 243, and 244 is 4, but the number of sub-electrodes is not limited thereto, and by further increasing the number of sub-electrodes constituting one second electrode, liquid crystal arrangement of a lens form may be more minutely or precisely adjusted.

In this way, by a vertical electric field that is formed by applying voltages Vcom, $V_0$, V1, and V2 to each of the common electrode 270, the first electrodes 230, and the second electrodes 240, liquid crystals are rearranged, and, in particular, liquid crystals in the interception portion are aligned in a vertical direction. Thereby, light is completely intercepted in the interception portion CL. Further, by liquid crystals that are arranged in a lens form in the lens portion OP, light is transmitted while being refracted. That is, as the interception portion CL that intercepts light and the lens portion OP that transmits light are formed alternately repeatedly one by one in a horizontal direction of a screen, a path in which a left-eye image and a right-eye image are projected in a left eye direction and a right eye direction, respectively, of the user can be formed. In this way, a left-eye image and a right-eye image that are separated by the barrier portion 200 have predetermined disparity to each other, and the user obtains depth information like viewing an actual stereoscopic object and thus feels a stereoscopic effect.

In the first embodiment, in a light transmitting area, liquid crystals are arranged in a lens form to refract light and provide effects of enlarging an opening while sustaining a stereoscopic image of a high image quality, and thus, luminance can be improved, and such effect will be described in detail with reference to FIGS. 5 and 6.

Figure 5:
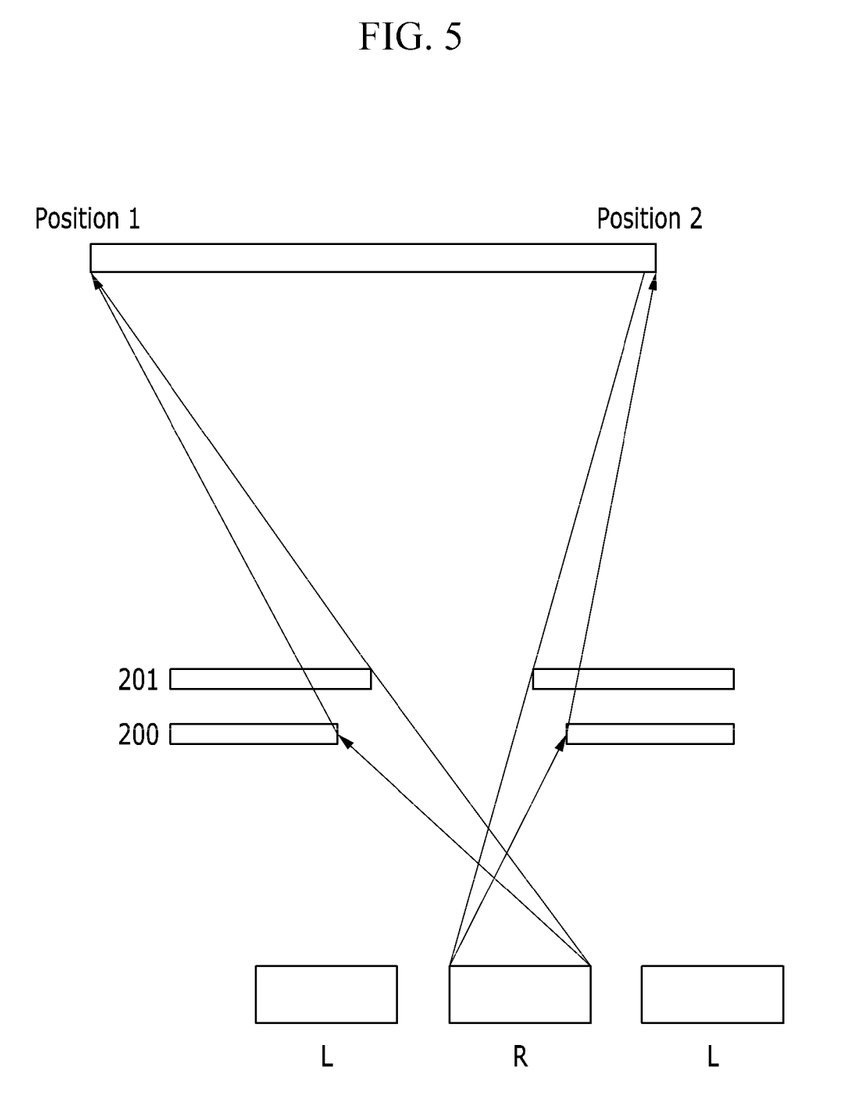
FIG. 5 is a diagram illustrating a profile of light that transmits a barrier portion.
Figure 6:
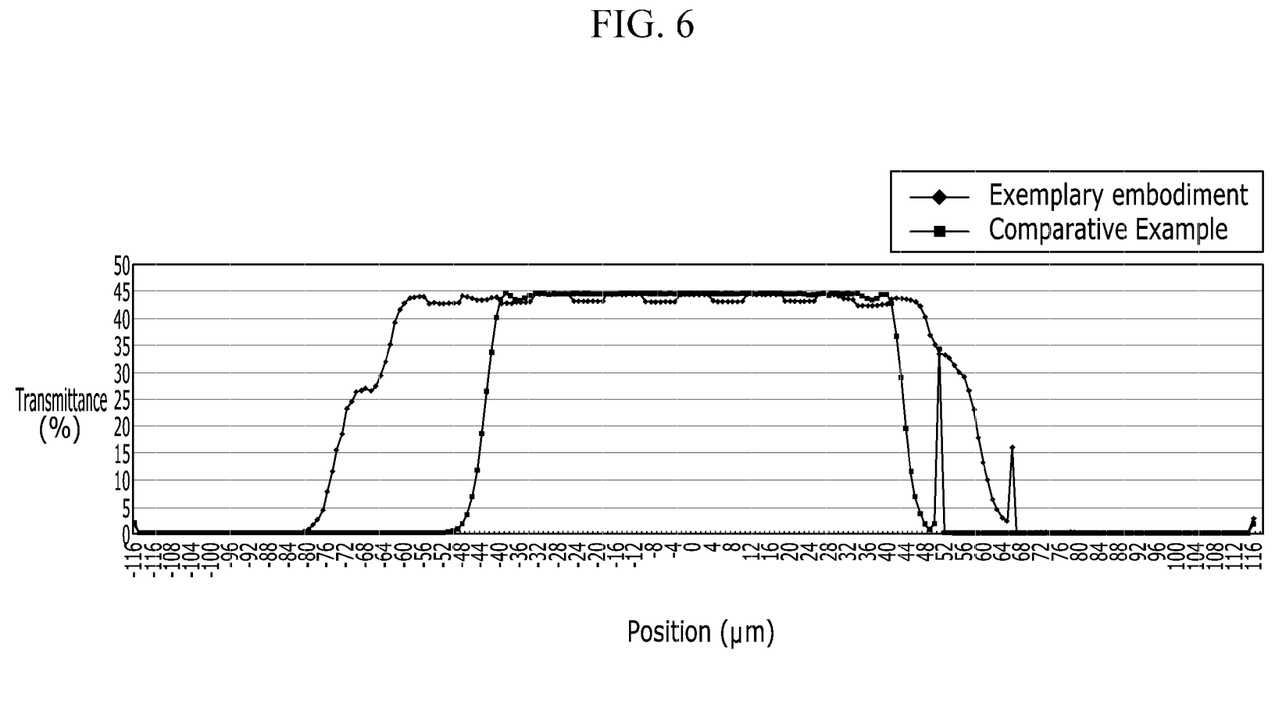
FIG. 6 is a graph illustrating a measured result of transmittance of a barrier portion.

FIG. 5 is a diagram illustrating a profile of light that transmits a barrier portion, and FIG. 6 is a graph illustrating a measured result of transmittance of a barrier portion.

In FIG. 5, reference numeral 200 indicates a barrier portion according to a first embodiment, and reference numeral 201 indicates an comparative example of a barrier portion (hereinafter, referred to as a barrier portion of Comparative Example which is introduced only for explaining unexpected effects of the barrier portion according to embodiments of the present invention) in which liquid crystals is not arranged into a lens shape in a light transmission area. In a barrier portion in which an interception portion and a light transmission portion are alternately formed, in order to improve an image quality of a stereoscopic image, crosstalk which refers to degree of mixture of a left-eye image L and a right-eye image R should be reduced, and for this purpose, it is necessary to limit the size of a light transmission portion to a predetermined level, for example, about 40% of an entire barrier portion. That is, in a light transmission portion of the barrier portion 201 of Comparative Example, liquid crystals are not arranged in a lens shape, and a ratio (aperture ratio) of the light transmission portion is formed in about 40%. However, in the barrier portion 200 according to a first embodiment, even if a ratio (aperture ratio) of a light transmission portion, i.e., a lens portion OL in which light can transmit is formed in about 60%, crosstalk does not occur.

As shown in FIG. 5, when reviewing a profile of light that passes through the barrier portion 200, the almost same imaging position as that of a case of passing through the barrier portion 201 of Comparative Example can be obtained. This represents that in the transmission portion, even in an aperture ratio higher than that of Comparative Example, crosstalk does not occur, and an excellent quality of 3D image can be obtained. That is, in the first embodiment, in an light transmitting area, light is refracted by liquid crystals that are arranged in a lens form, and by a focusing effect thereof, even in a high aperture ratio, a light profile which is same with or similar to a light profile in a low aperture ration can be obtained.

Next, referring to FIG. 6, a luminance improvement effect according to a first embodiment can be determined. An embodiment of FIG. 6 represents a transmittance graph of the barrier portion 200 in FIG. 5, and Comparative Example represents a transmittance graph of the barrier portion 201 of Comparative Example in FIG. 5. Referring to FIG. 6, it can be determined that the barrier portion 200 of the first embodiment has entire luminance (area of a graph) larger than the barrier portion 201 of Comparative Example. That is, according to the barrier portion 200 of the first embodiment, while displaying a 3D image of the same quality (see FIG. 5), higher luminance can be obtained, compared with the barrier portion 201 of Comparative Example.

In this way, according to the first embodiment, even if a transmitting area of light is widely formed, by a focusing effect of liquid crystals arranged in a lens form, because the same profile as that of light that transmits a narrow area can be obtained, while generation of crosstalk is reduced, a 3D image with improved luminance can be obtained.

Hereinafter, an electronic image device according to a second embodiment will be described with reference to FIG. 7.

Figure 7A:
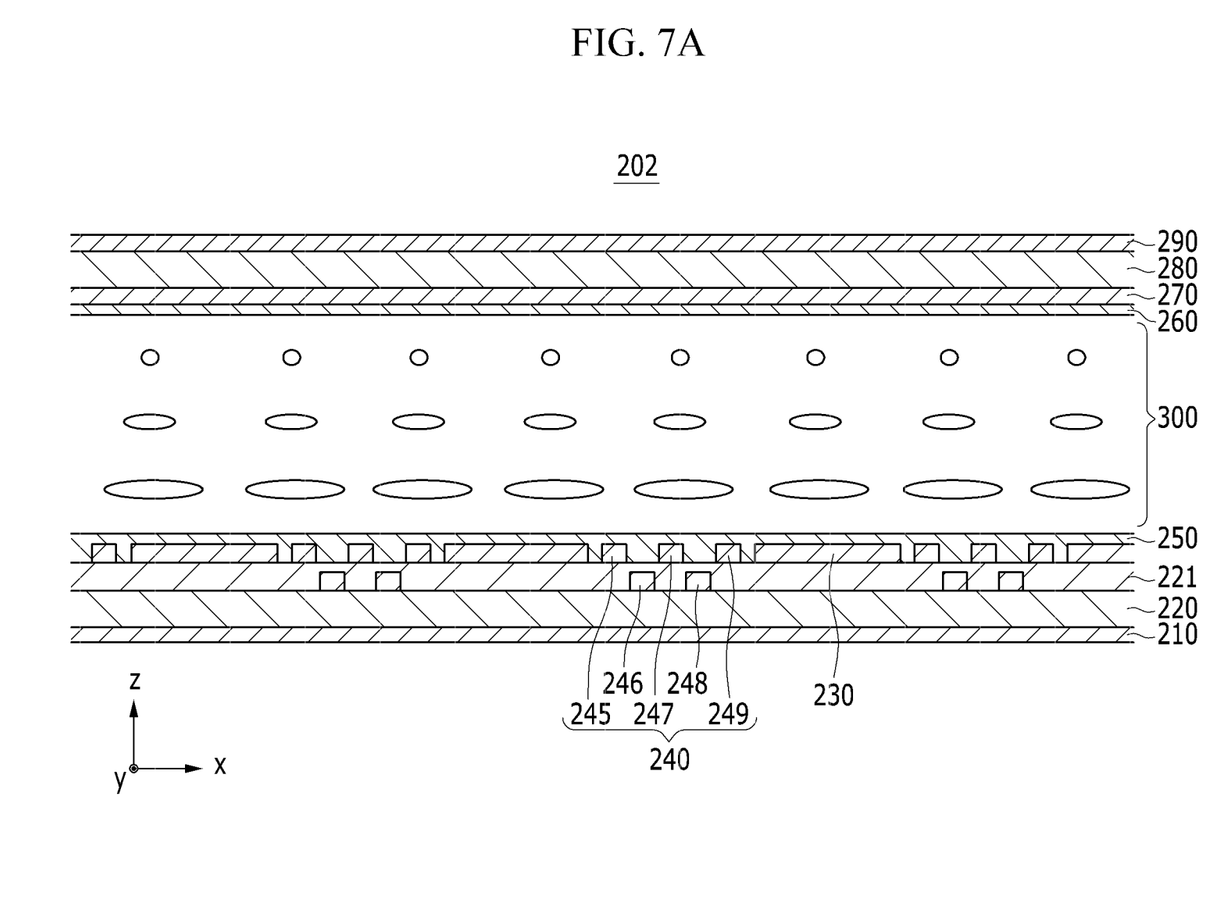
FIG. 7A is a cross-sectional view illustrating a barrier portion according to a second embodiment.
Figure 7B:
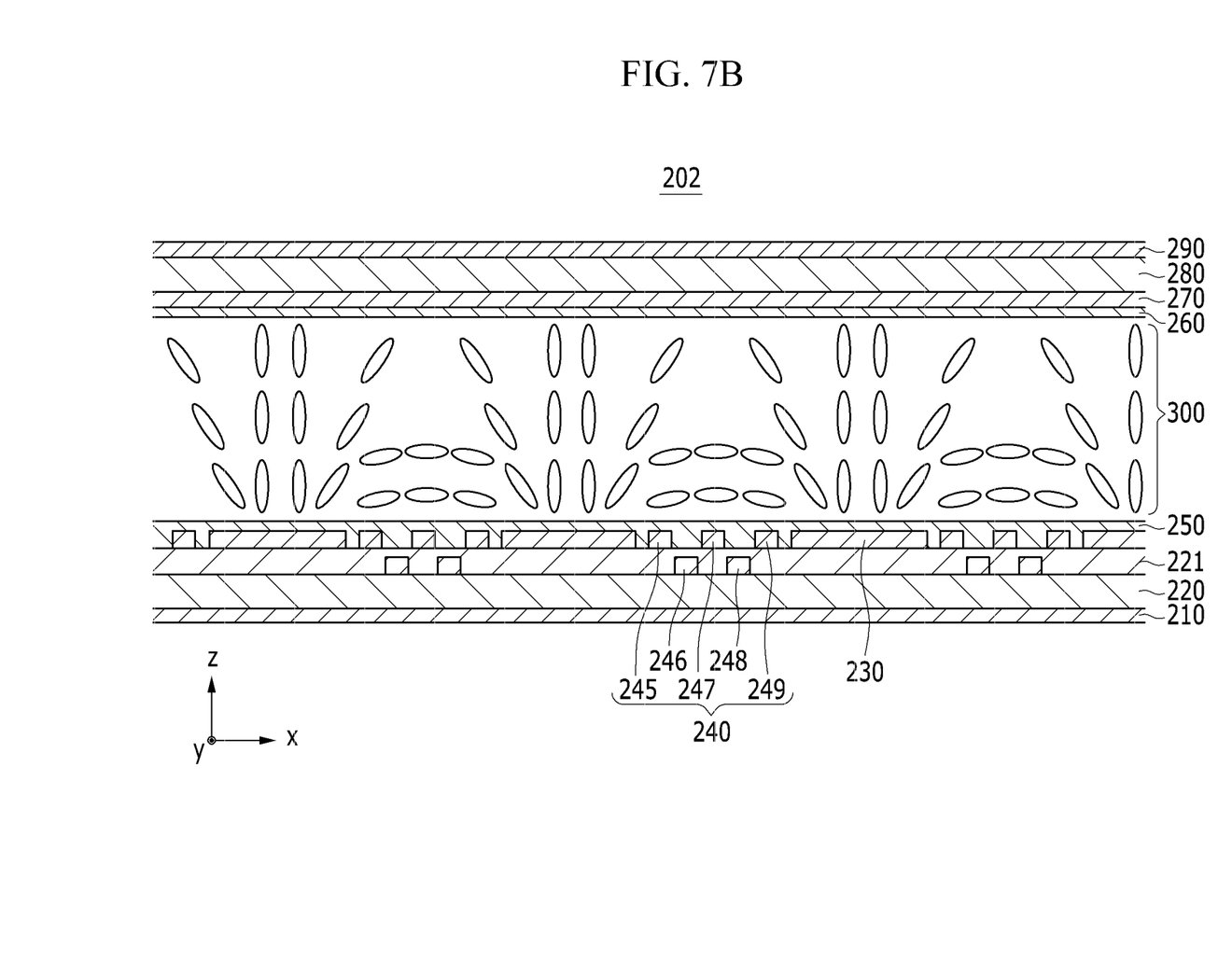
FIG. 7B is a cross-sectional view illustrating a state in which an electric field is formed in a liquid crystal layer in the barrier portion of FIG. 7A.

FIGS. 7A and 7B are cross-sectional views illustrating a barrier portion 202 that is included in an electronic image device according to a second embodiment. Because the second embodiment is different from the first embodiment in only a configuration of the barrier portion 202, for convenience, hereinafter, only the barrier portion 202 will be described.

The barrier portion 202 includes a first substrate 220, a second substrate 280, first electrodes 230, an insulation layer 221, second electrodes 240, a common electrode 270, a liquid crystal layer 300, a first orientation film 250, a second orientation film 260, a first polarizing plate 210, and a second polarizing plate 290. When comparing the barrier portion 202 with a barrier portion of the first embodiment, only configurations of the first electrodes 230, the insulation layer 221, and the second electrodes 240 disposed on the first substrate 220 are different from the first embodiment, and other configurations are the same.

As shown in FIG. 7A, the second electrodes 240 according to the second embodiment include fifth to ninth sub-electrodes 245, 246, 247, 248, and 249. In an area corresponding to a lens portion OP of the first substrate 220, a portion of the second electrodes 240, for example, the sixth and eighth sub-electrodes 246 and 248 are disposed. On the sixth and eighth sub-electrodes 246 and 248, the insulation layer 221 is formed to cover the entire first substrate 220. On the insulation layer 221, the remaining second electrodes 240 and the first substrate 220 are disposed. Specifically, the first electrodes 230 are disposed at an area corresponding to an interception portion CL, and the fifth, seventh, and ninth sub-electrodes 245, 247, and 249 are disposed at a lens portion OP area corresponding between interception portions CL. The fifth to the ninth sub-electrode 245, 246, 247, 248, 249 are closely formed in a range that is not overlapped.

Hereinafter, in the second embodiment, the control of the barrier portion 202 for displaying a 2D image and a 3D image will be described.

Referring to FIG. 7A, in order to display a 2D image, because an electric field is not formed in the barrier portion 202, as in the first embodiment, the entire barrier portion 202 is formed in a transmission type. Thereby, an image for both eyes that is displayed by a display unit (not shown) is viewed by a user's both eyes via the barrier portion 202, whereby the user recognizes a 2D image.

Referring to FIG. 7B, in order to display a 3D image, a common voltage Vcom is applied to the common electrode 270, as in the first embodiment, and a liquid crystal driving voltage $V_0$ is applied to the first electrodes 230. Thereby, light is not transmitted and is intercepted in the interception portion CL. In the second electrodes 240, in a range larger than a common voltage Vcom and smaller than a liquid crystal driving voltage $V_0$, voltage is differentially applied to each of the sub-electrodes 245, 246, 247, 248, and 249. In some embodiments, the smaller a distance between a sub-electrode and a central portion of the lens portion OP is, the smaller a magnitude of the voltage applied to the sub-electrode is. Thus, liquid crystals that are positioned in the lens portion OP are arranged to form a lens form. Specifically, according to the second embodiment, because the sub-electrodes 245, 246, 247, 248, and 249 are divided into two layers and arranged, the sub-electrodes 245, 246, 247, 248, and 249 can be more closely arranged and thus arrangement of liquid crystals can be minutely and precisely adjusted to form a lens form. In the second embodiment, it is exemplified that total five sub-electrodes 245, 246, 247, 248, and 249 are formed in different layers, but the number of sub-electrodes is not limited thereto, and by further increasing the number of sub-electrodes, liquid crystal arrangement of a lens form may be more minutely adjusted to form a precise lens shape.

In this way, according to the second embodiment, by arranging more minutely liquid crystals of a lens portion OP, a light focusing effect of liquid crystals that are arranged in a lens form can be further improved.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| Display unit: 100 | Barrier portion: 200, 202 |
| First electrode: 230 | Second electrode: 240 |
| Common electrode: 270 | |

What is claimed is:

1. An electronic image device comprising:
a display unit configured to display an image; and
a barrier portion disposed over the display unit and configured to control transmission of the image to a user,
wherein the barrier portion comprises
a first substrate and a second substrate opposing each other to define a space in which interception portions and lens portions are to be alternately disposed;
a common electrode disposed over one surface of the second substrate facing the first substrate;
a liquid crystal layer disposed between the first substrate and the second substrate;
a first electrode disposed at a region corresponding to each of the interception portions; and
a second electrode comprising a plurality of sub-electrodes and disposed at a region corresponding to each of the lens portions.

2. The electronic image device of claim 1, wherein the number of the sub-electrodes of the second electrode is three or more, and
wherein the electronic image device is configured to apply voltage to each sub-electrode such that the value of the voltage applied to a first one of the sub-electrodes is smaller than that of the voltage applied a second sub-electrode when a distance between the first sub-electrode and a central portion of the lens portion is smaller than that between the second sub-electrode and the central portion of the lens portion.

3. The electronic image device of claim 1, wherein the first electrode is formed in a single piece.

4. The electronic image device of claim 1, wherein the first electrode and at least part of the sub-electrodes of the second electrode are formed in a common imaginary plane disposed over the first substrate.

5. The electronic image device of claim 1, further comprising at least one insulation layer that is provided over the first substrate,
wherein at least one of the plurality of sub-electrodes is disposed between the insulation layer and the first substrate and separated from another sub-electrode by the insulation layer.

6. The electronic image device of claim 1, wherein each of the first electrode and the second electrode are formed in a stripe shape.

7. The electronic image device of claim 1, wherein the liquid crystal layer comprises liquid crystals, and
the liquid crystals positioned in the lens portion are arranged in a lens form when voltage is applied.

8. The electronic image device of claim 1, wherein the barrier portion further comprises:
a first polarizing plate disposed over an outer surface of the first substrate; and
a second polarizing plate disposed over an outer surface of the second substrate.

9. The electronic image device of claim 8, wherein a polarization axis of the first polarizing plate and a polarization axis of the second polarizing plate are generally perpendicular to each other.

10. The electronic image device of claim 1, wherein the barrier portion further comprises:
- a first orientation film disposed between the first substrate and the liquid crystal layer; and
- a second orientation film disposed between the second substrate and the liquid crystal layer.

11. The electronic image device of claim 10, wherein a rubbing direction of the first orientation film and a rubbing direction of the second orientation film are generally perpendicular to each other.

12. The electronic image device of claim 1, wherein the barrier portion is configured to allow light that is emitted from the display unit to be transmitted through the interception portions when voltage is not applied to the first and second electrodes, and
- the barrier portion is further configured to intercept light that is emitted from the display unit at the interception portions when voltage is applied to the first and second electrodes.

* * * * *